United States Patent [19]

Onishi et al.

[11] 4,445,468

[45] May 1, 1984

[54] 2-STROKE INTERNAL COMBUSTION ENGINE AND AN IGNITION-COMBUSTION METHOD OF AN INTERNAL COMBUSTION ENGINE

[75] Inventors: Sigeru Onishi, Kanazawa; Souk H. Jo, Tokyo, both of Japan

[73] Assignee: Nippon Clean Engine Research Institute Co., Ltd., Kanazawa, Japan

[21] Appl. No.: 397,788

[22] Filed: Jul. 13, 1982

[30] Foreign Application Priority Data

Oct. 23, 1981 [JP] Japan .................................. 56-170475

[51] Int. Cl.³ .............................................. F02B 33/04
[52] U.S. Cl. ................................. 123/73 C; 123/65 R; 123/73 R; 123/73 B; 123/73 D; 123/73 PP; 123/73 S; 123/324
[58] Field of Search .............. 123/73 R, 73 C, 73 CA, 123/73 CB, 73 CC, 73 D, 73 B, 73 PP, 73 CP, 65 R, 324

[56] References Cited

U.S. PATENT DOCUMENTS

| | | | |
|---|---|---|---|
| 1,600,795 | 9/1926 | Cage | 123/73 C |
| 1,780,635 | 11/1930 | Spencer | 123/73 A |
| 3,817,227 | 6/1974 | Onishi | 123/73 A |
| 4,185,598 | 1/1980 | Onishi | 123/73 A |
| 4,204,488 | 5/1980 | Onishi | 123/73 A |
| 4,213,431 | 7/1980 | Onishi | 123/73 R |
| 4,237,831 | 12/1980 | Noguchi et al. | 123/73 A X |
| 4,341,188 | 7/1982 | Nerstrom | 123/73 R X |

FOREIGN PATENT DOCUMENTS

| | | | |
|---|---|---|---|
| 372962 | 4/1923 | Fed. Rep. of Germany | 123/73 R |
| 436969 | 10/1935 | United Kingdom | 123/73 C |

*Primary Examiner*—Wendell E. Burns
*Attorney, Agent, or Firm*—Parkhurst & Oliff

[57] ABSTRACT

A 2-stroke engine having a combustion chamber and a scavenge port which is open to the combustion chamber. When the engine is operating under a light load in which a large amount of unburned components, incompletely burned components and oxygen remains in the combustion chamber, fresh air is fed into the combustion chamber from the scavenge port at a low speed so that the fresh air does not disturb the residual gas in the combustion chamber. As a result of this, oxidation of the unburned components and the incompletely burned components continues without interruption during the expansion stroke and the compression stroke and causes self-ignition of the residual gas at the end of the compression stroke. The self-ignited residual gas causes ignition of the fuel injected into the combustion chamber from a fuel injector.

26 Claims, 20 Drawing Figures

(a)    (b)

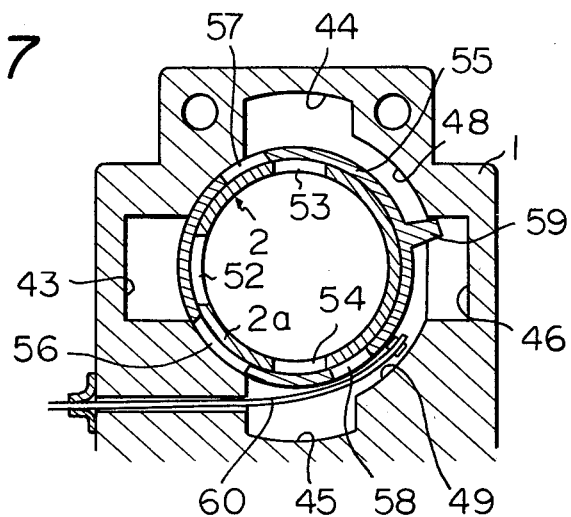
Fig. 7
(a)
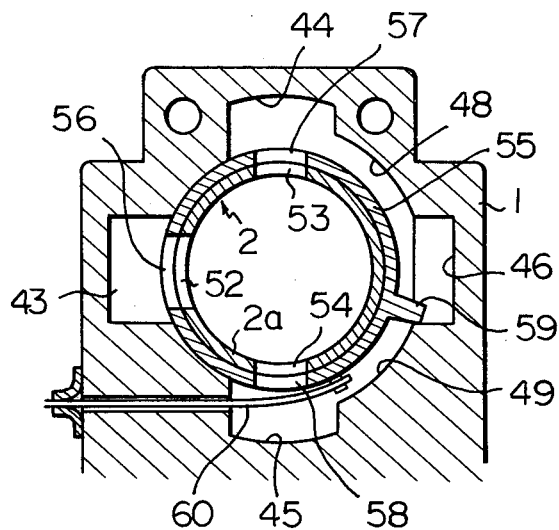
(b)

(a)

(b)

(a)

(b)

2-STROKE INTERNAL COMBUSTION ENGINE AND AN IGNITION-COMBUSTION METHOD OF AN INTERNAL COMBUSTION ENGINE

BACKGROUND OF THE INVENTION

The present invention relates to a fuel-injection type 2-stroke engine and an ignition-combustion method of a fuel-injection type 2-stroke engine.

As is known to those skilled in the art, a spark-ignition type 2-stroke engine, in which fuel is injected into the cylinder of the engine, has an advantage in that the amount of fuel escaping into the exhaust port can be considerably reduced and, as a result, good thermal efficiency and good exhaust emission can be obtained when the engine is operating under a medium or a heavy load. However, if such a 2-stroke engine is operating under a light load, it is difficult to maintain stable combustion. Therefore, in a conventional 2-stroke engine, in order to obtain stable combustion when the engine is operating under a light load, the engine is operated by using a rich air-fuel mixture or the start of combustion is delayed by greatly retarding the ignition timing. As a result of this, in a conventional 2-stroke engine, in spite of injecting fuel into the cylinder of the engine, there are drawbacks in that when the engine is operating under a light load, thermal efficiency is reduced and, in addition, the amount of harmful components, such as carbon monoxide and hydrocarbon, in the exhaust gas is increased.

SUMMARY OF THE INVENTION

An object of the present invention is to provide an ignition-combustion method and a 2-stroke engine which are capable of considerably increasing thermal efficiency and reducing the amount of harmful components in the exhaust gas, as compared with a prior 2-stroke engine, when the engine is operating under a light load.

According to the present invention, there is provided an ignition-combustion method of an internal combustion engine comprising a combustion chamber, a fuel injector arranged in the combustion chamber, an air-inlet port for feeding fresh air into the combustion chamber, and an exhaust gas-outlet port for discharging exhaust gas from the combustion chamber, said method comprising the steps of: discharging the exhaust gas from the combustion chamber via the exhaust gas-outlet port while retaining a large amount of residual gas, containing unburned components, incompletely burned components and oxygen therein, in the combustion chamber; gently feeding fresh air into the combustion chamber from the air-inlet port while suppressing disturbance of the residual gas for continuing the oxidizing reaction of the unburned components and the incompletely burned components; injecting fuel into the combustion chamber from the fuel injector to form a combustible mixture consisting of fuel and fresh air; and compressing the residual gas and said combustible mixture in the combustion chamber to accelerate the oxidizing reaction and bring about self-ignition of the residual gas, which self-ignited residual gas in turn ignites said combustible mixture.

In addition, according to the present invention, there is provided an ignition-combustion method of a 2-stroke engine comprising a combustion chamber, a fuel injector arranged in the combustion chamber, a scavenge port open to the combustion chamber, an exhaust port open to the combustion chamber, a crankcase having an interior chamber therein, and a transfer passage interconnecting the scavenge port to the interior chamber of the crankcase, said method comprising the steps of: feeding fresh air into the interior chamber of the crankcase; compressing the fresh air in the interior chamber of the crankcase and discharging the exhaust gas from the combustion chamber via the exhaust port while retaining a large amount of residual gas, containing unburned components, incompletely burned components and oxygen therein, in the combustion chamber; leading the fresh air in the interior chamber of the crankcase into the transfer passage; restricting the velocity of the flow of the fresh air flowing within the transfer passage when the engine is operating under a partial load; gently feeding the fresh air into the combustion chamber from the scavenge port while suppressing disturbance of the residual gas for continuing the oxidizing reaction of the unburned components and the incompletely burned components; injecting fuel into the combustion chamber from the fuel injector to form a combustible mixture consisting of fuel and fresh air; compressing the residual gas and the combustible mixture in the combustion chamber to accelerate the oxidizing reaction and bring about self-ignition of the residual gas, which self-ignited residual gas in turn ignites said combustible mixture.

Furthermore, according to the present invention, there is provided a 2-stroke internal combustion engine comprising: a crankcase having an interior chamber therein; a cylinder block mounted on said crankcase and having a cylinder bore therein; a piston reciprocally movable in said cylinder bore, said piston and said cylinder bore defining a combustion chamber; a fuel injector arranged in said combustion chamber for injecting fuel into the combustion chamber; a transfer passage having a scavenge port at one end and an air-inlet opening at the other end, said scavenge port and said air-inlet opening being open to said combustion chamber and the interior chamber of said crankcase, respectively, so as to feed the fresh air in said interior chamber into said combustion chamber; an exhaust passage having an exhaust port which is open to the combustion chamber in order to discharge exhaust gas from said combustion chamber; and restricting means arranged in said transfer passage for restricting the velocity of the flow of fresh air flowing within said transfer passage when the engine is operating under a partial load.

In the present invention, in order to improve combustion when the engine is operating under a light load, by retaining a large amount of unburned components, incompletely burned components and oxygen in the residual gas produced in the combustion chamber in the previous cycle, and by maintaining the residual gas at a high temperature and suppressing disturbance of and cooling of the residual gas, which are caused by the abrupt inflow of a fresh air charge, the production of a strong squish flow, and the strong jet flowing between the main combustion chamber and the precombustion chamber, the oxidizing reaction is continuously carried out in the residual gas during the time period from the expansion stroke to the end of the compression stroke even after the completion of combustion in the previous cycle. Then the continuous oxidizing reaction causes self-ignition of the gas in the combustion chamber and, next, self-ignition of the gas in the combustion chamber causes the ignition of the fresh air-fuel mixture in the combustion chamber.

In the above-mentioned combustion process according to the present invention, even after the completion of main combustion producing a large amount of heat, a gentle oxidizing reaction, rather than rapid combustion, is continuously carried out in the residual gas during the expansion stroke, the exhaust-scavenging stroke, and the initial stage of the compression stroke. The gentle oxidizing reaction, carried out in the residual gas, is rapidly accelerated in accordance with an increase in the density and the temperature of the residual gas during the compression stroke and causes self-ignition of the residual gas, which in turn causes ignition of the fresh air-fuel mixture. In such a combustion process, since a large amount of inert residual gas is present in the combustion chamber, gentle and stable combustion is carried out in each cycle, but extraordinary combustion, causing an abrupt increase in pressure and caused by the surface ignition, the pre-ignition, the self-ignition in a diesel engine and the self-ignition causing a knocking in the gasoline engine, is not carried out. In addition, the fresh air-fresh mixture, diffusing into and mixed with a large amount of the residual gas, is not completely burned in the residual gas and remains in the form of unburned components and incompletely burned components. These unburned components and incompletely burned components continuously cause an oxidizing reaction together with oxygen prevailing within the residual gas during the exhaust-scavenging stroke and the compression stroke of the next cycle and then cause self-ignition of the next cycle.

As mentioned above, in the present invention, although fuel is injected into the cylinder of the engine and then self-ignition occurs, self-ignition according to the present invention is clearly different from that in a conventional diesel engine in respect to the following points. That is, in a diesel engine, fuel is injected at a crank angle near the top dead center at the end of the compression stroke. Contrary to this, in the present invention, the injection of fuel is started between a crank angle (60 to 70 degrees before the bottom dead center) at which the exhaust and scavenging operation is started and a crank angle of 50 degrees before the top dead center, and the injection of fuel is mainly carried out during the initial stage and the intermediate stage of the compression stroke. In addition, in the present invention, the compression ratio of the engine is a relatively low ratio which is smaller than 12:1. Furthermore, in the present invention, it is impossible to start the engine without using a spark plug or a glow plug independently of the temperature of the air fed into the cylinder of the engine.

Another engine in which self-ignition occurs is the Lohman engine. However, the compression ratio used in the Lohman engine is quite different from that used in the present invention and, therefore, self-ignition in the Lohman engine is clearly different from that according to the present invention.

On the other hand, in a 2-stroke premixed charge engine (a carburetor engine), the idea of causing self-ignition by using an active thermoatmosphere combustion system in which a relatively long transfer passage is provided for promoting the mixing of an air-fuel mixture, vaporization of the air-fuel mixture and the production of radicals is known (Japanese Patent Publication No. 56-38766 and Japanese Laid-open Patent Publication No. 54-28916 etc). However, the feature of the present invention resides in the fact that fuel is injected into the cylinder of the engine and then gentle and stable combustion is carried out in each cycle in such a way that atomized fuel, fresh air flowing into the cylinder from the scavenge port, and high-temperature residual gas, which is produced in the previous cycle and remains in the cylinder, are so controlled that they are stratified and suitably mixed with each other by diffusion of the atomized fuel. Therefore, self-ignition according to the present invention is clearly different from self-ignition caused by mixing the premixed charge with the residual gas, as in the active thermoatmosphere combustion system.

In addition, in the above-mentioned 2-stroke premixed charge engine, the scavenging of burned gas is carried out by the mixture of fuel and air. Contrary to this, in the present invention, the scavenging of burned gas is carried out solely by air mainly immediately after the scavenge port opens, and fuel is injected into the cylinder at a desired time independently of the scavenging operation. Consequently, it is possible to prevent the atomized fuel in the cylinder from escaping into the exhaust port. In addition, since diffusion of the atomized fuel into the fresh air and the high-temperature residual gas is easily controlled and, at the same time, mixing of the atomized fuel with the fresh air and the residual gas is also easily controlled, it is possible to bring about combustion controlled by stratifying the atomized fuel, the fresh air and the residual gas. Referring to one of the effects obtained by bringing about such controlled combustion, for example, by starting the injection of fuel into the cylinder while the crank angle is from 90 degrees before the top dead center to 50 degrees before the top dead center in an ignition-combustion system according to the present invention, it is possible to considerably reduce the lower limit of the light load region in which stable self-ignition can be carried out as compared with the above-mentioned 2-stroke premixed charge engine. That is, in the case wherein fuel is injected into the cylinder at a crank angle near the bottom dead center, or scavenging is carried out by the premixed charge when the engine is operating under a light load wherein the delivery ratio is extremely small, since a combustible mixture excessively diffuses into a large amount of residual gas during the compression stroke, the density of the combustible mixture becomes small and, as a result, self-ignition is less easily brought about at a crank angle near the top dead center at the end of the compression stroke. Contrary to this, in the present invention, by starting the injection of fuel into the cylinder while the crank angle is from 90 degrees before the top dead center to 50 degrees before the top dead center, when the engine stroke reaches the end of the compression stroke, the combustible mixture is maintained in a diffusing and mixing state which is optimum for bringing about self-ignition and, at the same time, the combustible mixture is maintained at a temperature which is optimum for bringing about self-ignition. This results in stable self-ignition.

The present invention may be more fully understood from the description of the preferred embodiments of the invention set forth below, together with the accompanying drawings.

BRIEF DESCRIPTION OF THE DRAWINGS

In the drawings:

FIGS. 7A and 7B are cross-sectional views taken along the line VII—VII in FIG. 6;

DESCRIPTION OF THE PREFERRED EMBODIMENTS

Figure 1:
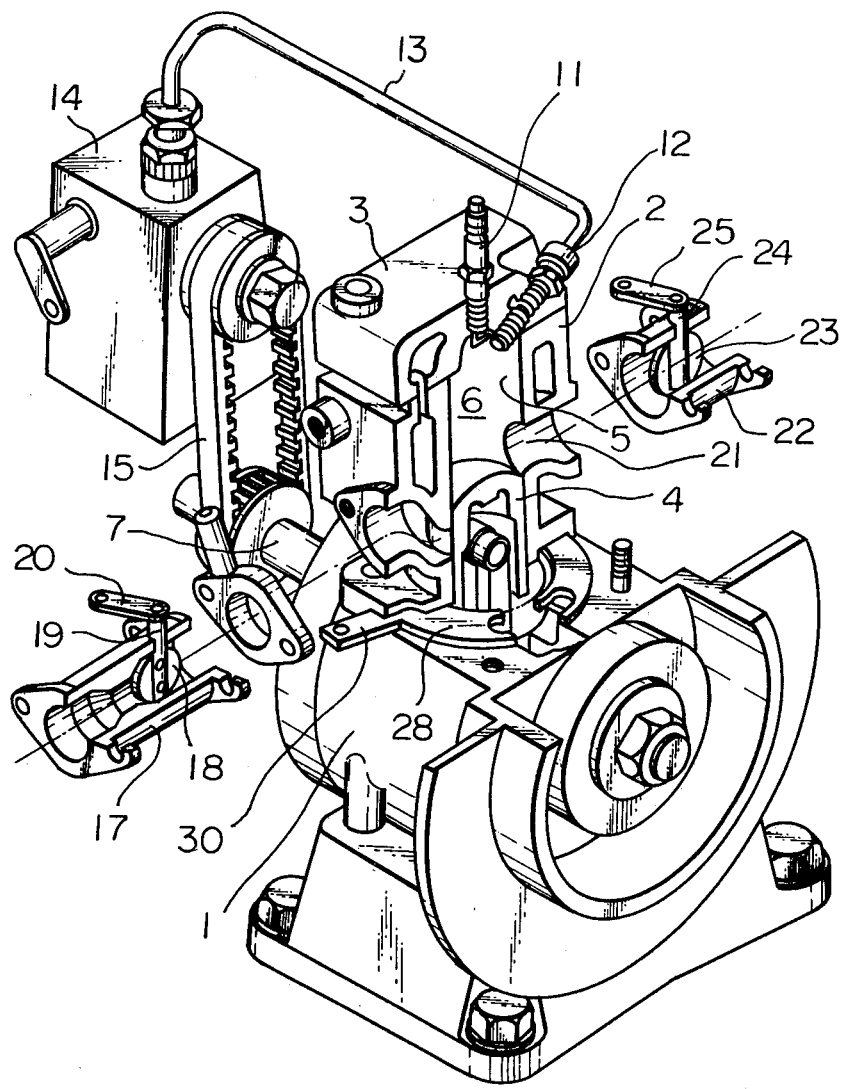
FIG. 1 is a perspective view of an embodiment of a 2-stroke engine according to the present invention with a portion being cut away.
Figure 2:
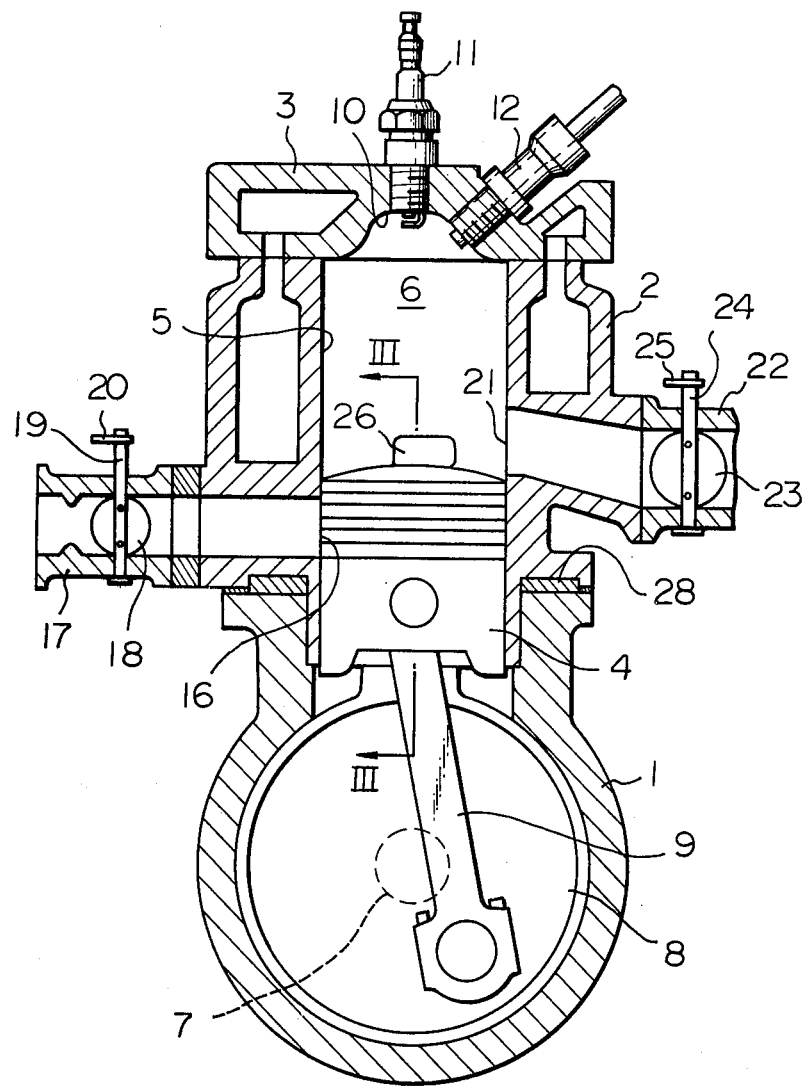
FIG. 2 is a cross-sectional side view of the engine illustrated in FIG. 1.
Figure 3:
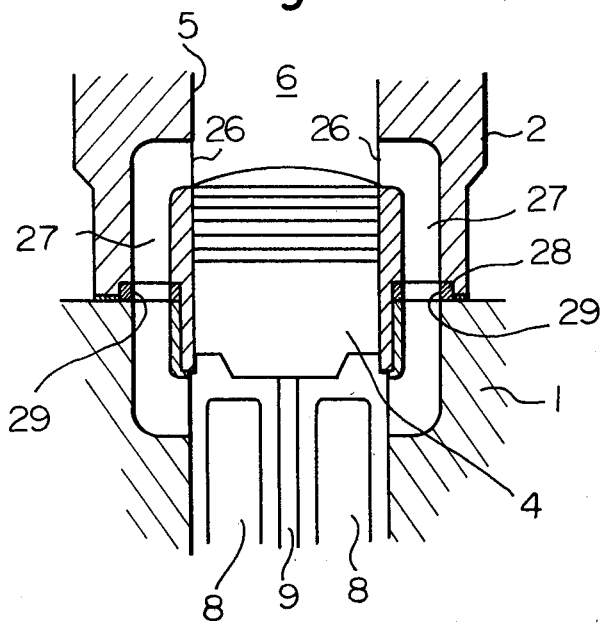
FIG. 3 is a cross-sectional view taken along the line III—III in FIG. 2.

FIGS. 1 through 3 illustrate a first embodiment showing the case wherein the present invention is applied to a Schnürle-type 2-stroke engine. In FIGS. 1 through 3, 1 designates a crankcase, 2 a cylinder block mounted on the crankcase 1, 3 a cylinder head fixed onto the cylinder block 2, and 4 a piston having an approximately flat top face and reciprocally moving in a cylinder bore 5 formed in the cylinder block 2; 6 designates a combustion chamber formed between the cylinder head 3 and the piston 4, 7 a crankshaft, 8 a balance weight fixed onto the crankshaft 7, and 9 a connecting rod interconnecting the piston 4 to the balance weight 8. The cylinder head 3 has a concave inner wall 10, and a spark plug or a glow plug 11 is arranged at the center of the concave inner wall 10. In addition, a fuel injector 12 is arranged on the concave inner wall 10 at a position near the spark plug 11. This fuel injector 12 is connected via a fuel conduit 13 to a fuel-injection pump 14 which is driven by the crankshaft 7 via a belt 15, and the injecting operation of the fuel injector 12 is controlled by the fuel-injection pump 14 as described hereinafter. As illustrated in FIG. 2, an inlet port 16, which is alternately covered and uncovered by the piston 4, is formed on the inner wall of the cylinder bore 5 and is connected to an induction pipe 17. A throttle valve 18, supported by a throttle shaft 19, is arranged in the induction pipe 17, and an arm 20, fixed onto the throttle shaft 19, is connected to a manual lever (not shown), such as an accelerator. When the piston 4 moves upward and uncovers the inlet port 16, ambient air is introduced into the interior of the crankcase 1 as in a conventional manner. After this, when the piston 4 moves downward and covers the inlet port 16, the operation of compressing the air introduced into the interior of the crankcase 1 is started.

As illustrated in FIGS. 1 and 2, an exhaust port 21, which is alternately covered and uncovered by the piston 4, is formed on the inner wall of the cylinder bore 5 and is connected to an exhaust pipe 22. An exhaust control valve 23, supported by a valve shaft 24, is arranged in the exhaust pipe 22, and an arm 25, fixed onto the valve shaft 24, is connected to the above-mentioned manual lever so that the degree of opening of the exhaust control valve 23 is increased in accordance with an increase in the degree of opening of the throttle valve 18.

Figure 4:
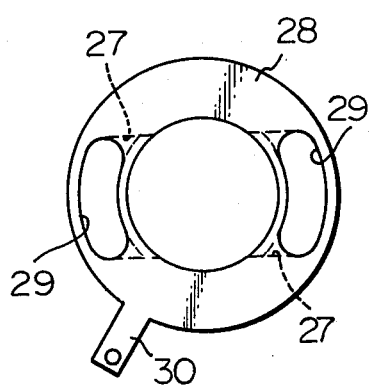
FIGS. 4A and 4B are plan views of the scavenging control valve.
Figure 4:
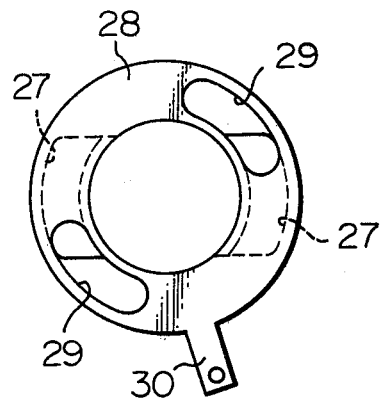

As illustrated in FIG. 3, a pair of scavenge ports 26 which are alternately covered and uncovered by the piston 4 is formed on the inner wall of the cylinder bore 5 and is connected to the interior of the crankcase 1 via corresponding transfer passages 27 which extend through the cylinder block 2 and the crankcase 1. In addition, as illustrated in FIGS. 1 through 3, a scavenge control valve 28, formed by an annular plate, is rotatably inserted between the top face of the crankcase 1 and the bottom face of the cylinder block 2. As illustrated in FIG. 4, the scavenging control valve 28 has a pair of openings 29 which can be aligned with the corresponding transfer passages 27. When the scavenging control valve 28 is in the position illustrated in FIG. 4 (a), each of the openings 29 is completely aligned with the corresponding transfer passage 27 and, therefore, at this time, the opening area of the openings 29 is at a maximum. When the scavenging control valve 28 is rotated to the position illustrated in FIG. 4 (b), each of the openings 29 is partially aligned with the corresponding transfer passage 27 and, therefore, the opening area of the openings 29 is reduced. The scavenge control valve 28 has an arm 30 formed in one piece thereon, and the arm 30 is connected to the above-mentioned manual lever for rotating the scavenge control valve 28 so that the opening area of the openings 29 is increased in accordance with an increase in the degree of opening of the throttle valve 18.

In operation, when the piston 4 moves downward and uncovers the exhaust port 21, burned gas in the combustion chamber 6 is discharged into the exhaust pipe 22 via the exhaust port 21. After this, when the piston 4 further moves downward and uncovers the scavenge ports 26, the air under pressure in the interior of the crankcase 1 is fed into the combustion chamber 6 from the scavenge ports 26 via the transfer passages 27 and scavenges the burned gas in the combustion chamber 6. Then fuel is injected into the combustion chamber 6 from the fuel injector 12 in the manner hereinafter described in detail.

In a 2-stroke engine as illustrated in FIG. 1, in the case wherein the engine is operating under a light load, a large amount of unburned components and incompletely burned components is contained in the burned gas located in the combustion chamber 6 during the expansion stroke. Then, even if the exhaust port 21 is opened and, next, the scavenge ports 26 are opened, a residual gas, having a high temperature and containing a large amount of unburned components and incompletely burned components therein, remains in the combustion chamber 6 and, thus, the oxidizing reaction of the unburned components and the incompletely burned components is continuously carried out. However, in a conventional 2-stroke engine, when the exhaust port 21 is opened and then the scavenge ports 26 are opened, since great disturbance of and violent flow of the residual gas occur in the combustion chamber 6, the oxidizing reaction of the unburned components and the incompletely burned components is interrupted. Nevertheless, in the present invention, the direction of the scavenge ports 26 is so selected that air, flowing out from the scavenge ports 26, disturbs the residual gas in the combustion chamber 6 as little as possible. In addition, since the opening area of the openings 29 of the scavenging control valve 28 is small when the engine is operating under a light load, air flowing within the transfer passages 27 is subjected to a flow resistance and, thus, the air flow into the combustion chamber 6 at a low speed so that it disturbs the residual gas in the combustion chamber 6 as little as possible. Furthermore, since the degree of opening of the exhaust control valve 23 is small when the engine is operating under a light load, burned gas discharged into the exhaust pipe 22 is subjected to a flow resistance and, thus, the burned gas is discharged from the combustion chamber 6 into the exhaust pipe 22 at a low speed so that it disturbs the residual gas in the combustion chamber 6 as little as possible. In addition, in the case wherein the degree of opening of the exhaust control valve 23 is small, the pulsating pressure of the exhaust gas is prevented from interferring with the residual gas in the combustion chamber 6. Consequently, in the present invention, when the engine is operating under a light load, since disturbance of and violent flow of the residual gas in the combustion chamber 6 are suppressed, the oxidizing reaction of the unburned components and the incompletely burned components continues without interruption. The oxidizing reaction is accelerated during the compression stroke and causes self-ignition at the end of the compression stroke. Then the self-ignition causes ignition of the fuel injected from the fuel injector 12 during the compression stroke.

Figure 5:
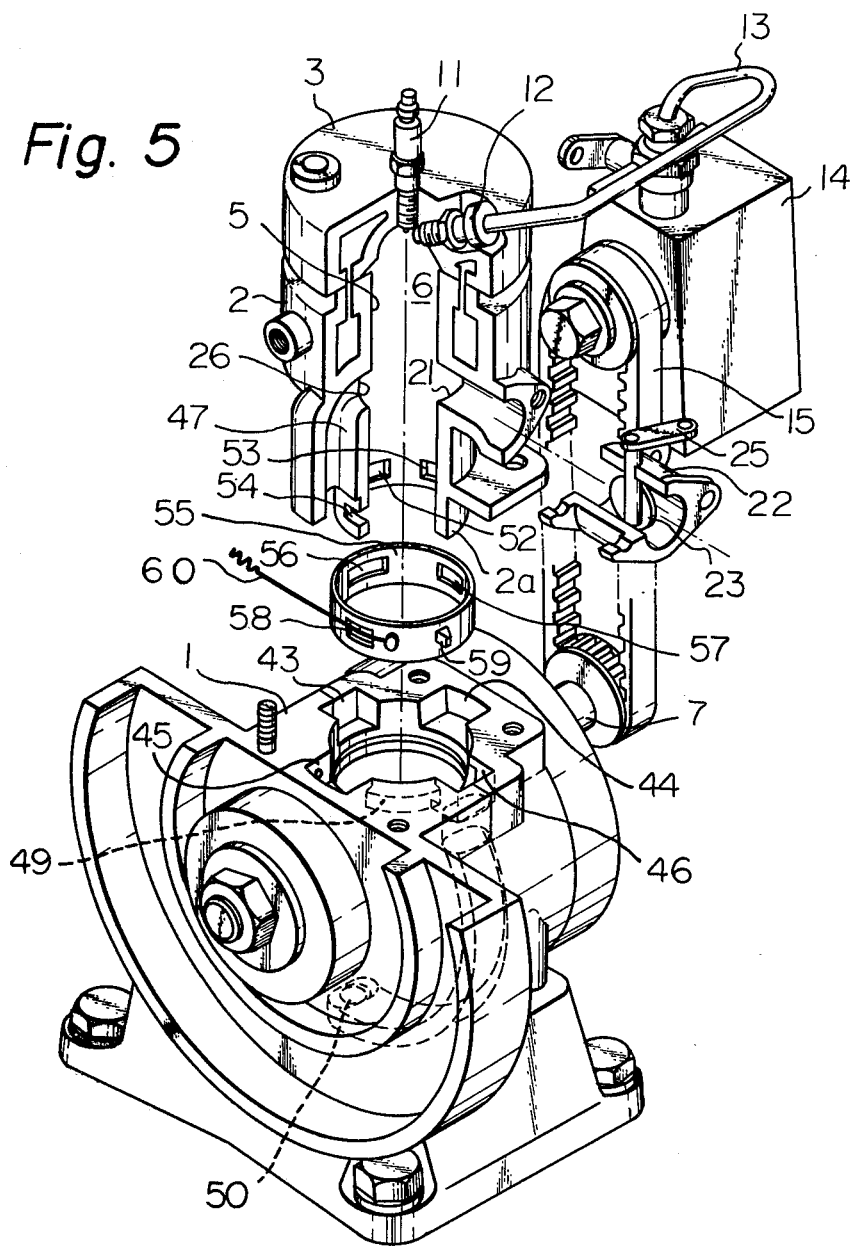
FIG. 5 is a perspective view of an alternative embodiment of a 2-stroke engine according to the present invention with a portion being cut away.
Figure 6:
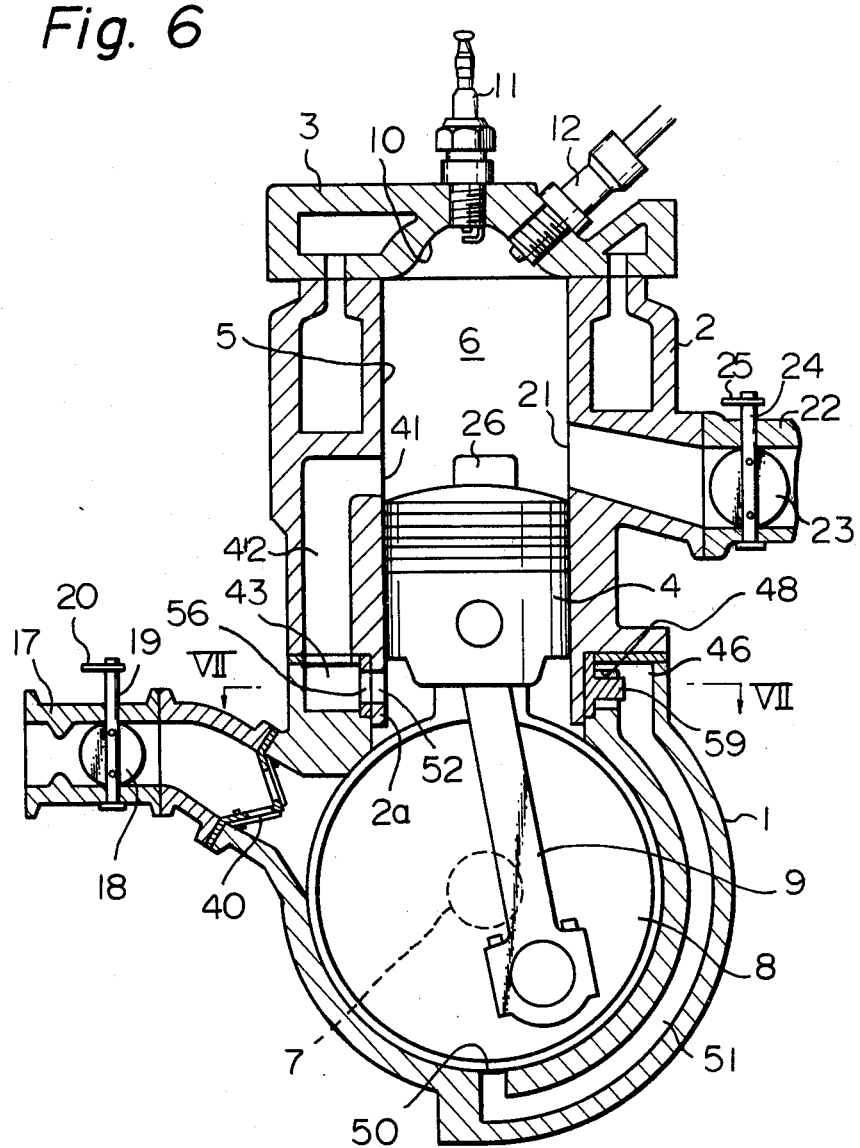
FIG. 6 is a cross-sectional side view of the engine illustrated in FIG. 5.

FIGS. 5 through 7 illustrate a second embodiment. In this embodiment, similar components are indicated by the same reference numerals used in FIGS. 1 through 4. In this embodiment, as illustrated in FIG. 6, the interior of the crankcase 1 is connected to the induction pipe 17 via a reed valve 40 and when the piston 4 moves upward, ambient air is introduced into the interior of the crankcase 1 via the induction pipe 17 and the reed valve 40. In addition, in this embodiment, another scavenge port 41, which is alternately covered and uncovered by the piston 4, is formed on the inner wall of the cylinder bore 5 in addition to a pair of scavenge ports 26. The scavenge port 41 is connected via a transfer passage 42, formed in the cylinder block 2, to a cutaway portion 43 formed in the crankcase 1 at a position located around the skirt portion 2a of the cylinder block 2. As illustrated in FIGS. 5 through 7, in addition to the cutaway portion 43, three cutaway portions 44, 45, 46 are formed in the crankcase 1 at a position located around the skirt portion 2a. The scavenge ports 26 are connected to the cutaway portions 44 and 45 via corresponding transfer passages 47 formed in the cylinder block 2, respectively, and each of the cutaway portions 44 and 45 is always connected to the cutaway portion 46 via corresponding grooves 48 and 49 formed in the crankcase 1, respectively. In addition, the cutaway portion 46 is connected to an air-inlet opening 50, formed on the bottom wall of the interior of the crankcase 1, via a transfer passage 51 having a relatively long length and a relatively small cross-sectional area. In this embodiment, a check valve, permitting air to flow into the cutaway portion 46 from the air-inlet opening 50, may be arranged in the transfer passage 51.

As illustrated in FIGS. 5 through 7, three air-inlet openings 52, 53 and 54, which are provided for the cutaway portions 43, 44 and 45, respectively, are formed in the skirt portion 2a, and a ring-shaped scavenging control valve 55 is rotatably inserted around the skirt portion 2a. This scavenge control valve 55 has three openings 56, 57 and 58 which can be aligned with the air-inlet openings 52, 53 and 54, respectively. In addition, the scavenge control valve 55 has a stop 59 formed in one piece thereon and arranged in the cutaway portion 46. The scavenging control valve 55 is connected to the manual lever via a cable 60.

When the engine is operating under a light load, all the openings 52, 53, 54 are closed by the scavenge control valve 55. Consequently, when the piston 4 uncovers the scavenge ports 26 and 41, air under pressure in the crankcase 1 is fed into the cutaway portions 44 and 45 via the air-inlet opening 50, the transfer passage 51, the cutaway portion 46 and the grooves 48 and 49 and then is fed into the combustion chamber 6 from the scavenge ports 26 via the transfer passages 47. Therefore, at this time, air flows into the combustion chamber 6 from only the scavenge ports 26. Since the transfer passage 51 has a relatively long length and a relatively small cross-sectional area as mentioned, the air flowing within the transfer passage 51 is subjected to a flow resistance and, thus, the air flows into the combustion chamber 6 from the scavenge ports 26 at a low speed. As a result of this, since violent flow of and disturbance of the residual gas is suppressed, the oxidizing reaction of the unburned components and the incompletely burned components continues without interruption and, thus, causes self-ignition at the end of the compression stroke. On the other hand, when the engine is operating under a heavy load, the scavenging control valve 55 is rotated to the position illustrated in FIG. 7 (b) so that the openings 56, 57 and 58 of the scavenging control valve 55 are aligned with the air-inlet openings 52, 53 and 54, respectively. At this time, air under pressure in the crankcase 1 is directly fed into the cutaway portions 43, 44 and 45 via the aligned pair of openings (52, 56), (53, 57) and (54, 58), respectively, and flows into the combustion chamber 6 from all of the scavenge ports 26 and 41 via the corresponding transfer passages 42 and 47. At this time, fuel injected from the fuel injector 12 is ignited by the spark plug 11.

Figure 8:
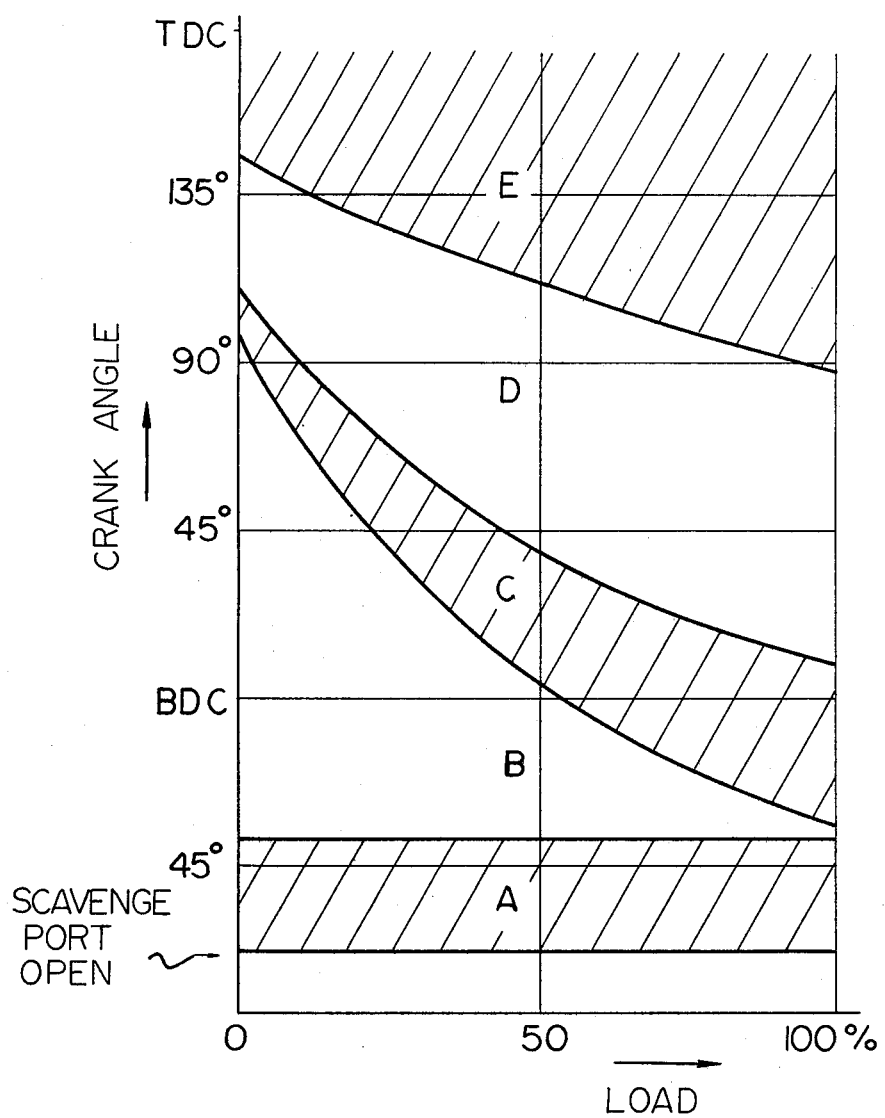
FIG. 8 is a diagram illustrating the injection timing of the fuel injector.

FIG. 8 illustrates the injection timing of the fuel injector 12 used in the first and second embodiments. In FIG. 8, the abscissa indicates the load of the engine (%), and the ordinate indicates the crank angle (degree). If the injection of fuel is started within the zone A illustrated in FIG. 8, the amount of fuel escaping into the exhaust pipe 22 is increased. That is, at this time, since part of the fuel injected from the fuel injector 11 escapes into the exhaust pipe 22 together with the scavenge air coming in from the scavenge ports 26 and 41, the operation of the engine is similar to that of a conventional 2-stroke premixed charge engine in which the premixed fuel and air are fed into the combustion chamber from the scavenge ports. The zones B, C and D, illustrated in FIG. 8, can be used in the engine according to the present invention. However, in the zone B, the fuel injected from the fuel injector 11 excessively diffuses into and is excessively mixed with the residual gas and, in the zone D, the atomized fuel is excessively stratified when ignition and combustion are caused. Contrary to this, in the zone C, satisfactory diffusion and stratification of the atomized fuel are carried out and, therefore, the injection timing, illustrated in the zone C, is optimum. On the other hand, although the injection timing, illustrated in the zone E in FIG. 8, is able to bring about combustion, satisfactory diffusion and mixing of the atomized fuel are not obtained, and a soot generates. FIG. 8 merely illustrates a general tendency of the injection timing and, therefore, the zones A, B, C, D and E are changed in accordance with changes in design factors and driving factors of the engine, for example, the direction of the openings of the scavenge ports 26, the strength of the squish flow and the swirl motion, the penetration force of fuel injected from the fuel injector 12, the spread angle of the fuel, and the property of the fuel etc.

Figure 9:
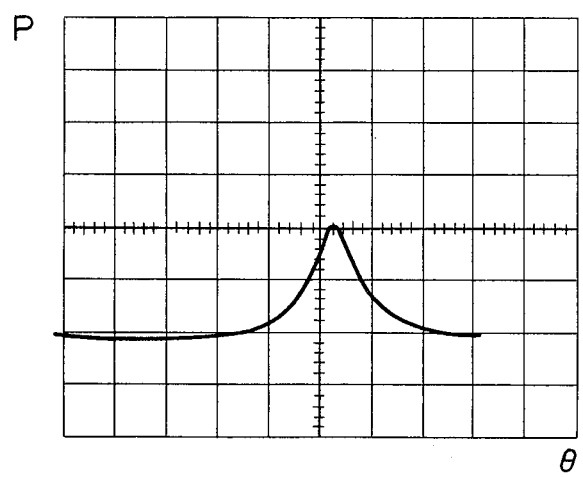
FIGS. 9A and 9B are indicator diagrams of the engine according to the present invention.
Figure 9:
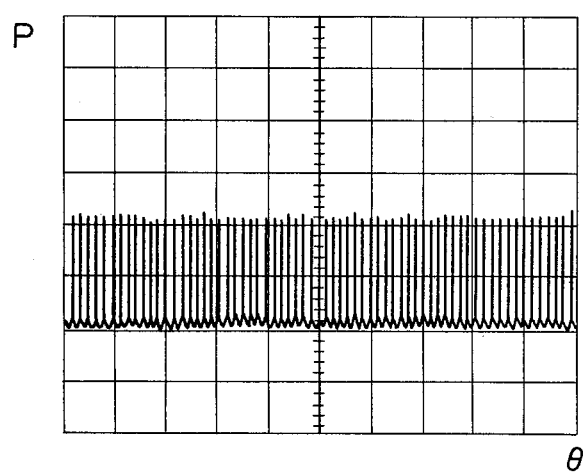
Figure 10:
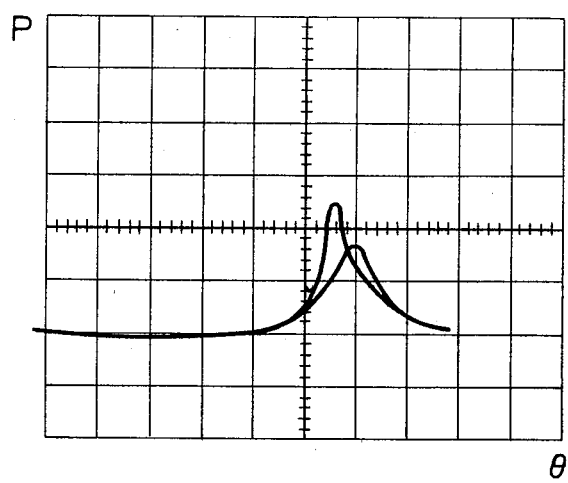
FIGS. 10A and 10B are indicator diagrams of a conventional 2-stroke engine.
Figure 10:
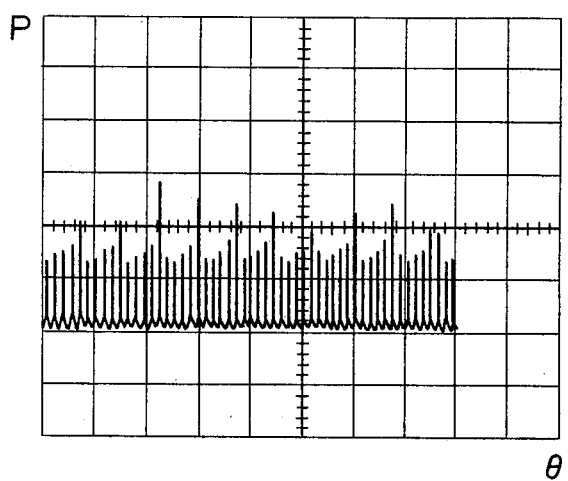

FIG. 9 illustrates an indicator diagram obtained by means of an ignition-combustion method according to the present invention. In FIG. 9, (a) illustrates an indicator diagram of a single cycle, and (b) indicates a comb-shaped indicator diagram of multi-cycles. On the other hand, FIG. 10 illustrates an indicator diagram obtained by using a conventional fuel-injection type 2-stroke spark-ignition engine operating under a light load. In FIG. 10, (a) illustrates an indicator diagram which is depicted in such a way that the changes in pressure in two cycles are superimposed, and (b) illustrates an indicator diagram of multi-cycles. In addition, in FIGS. 9 and 10, the ordinate P indicates pressure, and the abscissa $\theta$ indicates crank angle. From FIGS. 9 and 10, it will be understood that combustion according to the present invention is quite different from that of the conventional 2-stroke engine in respect to the pattern of heat release and the stability of combustion in each cycle. That is, the ignition-combustion method according to the present invention has such features that the main heat release is brought about at a crank angle near the top dead center, and the change in pressure $dP/d\theta$ is small, and that the maximum pressure $P_{max}$ in each cycle is almost the same.

Figure 11:
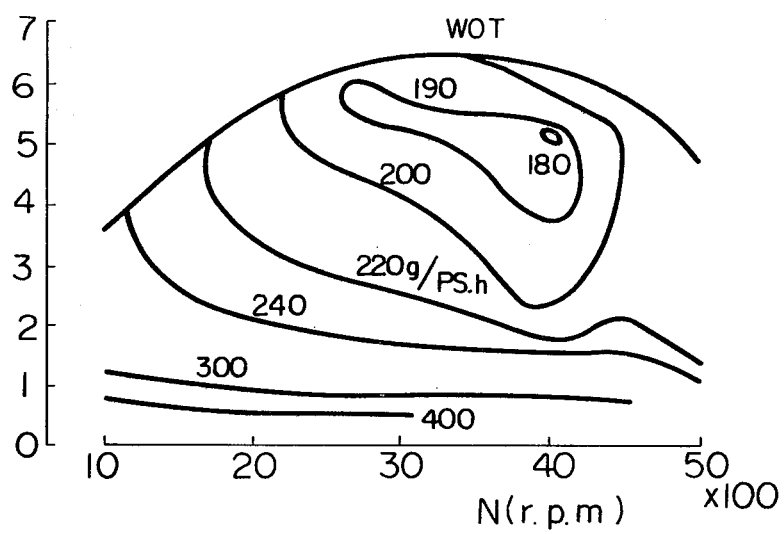
FIG. 11 is a diagram illustrating specific fuel consumption.
Figure 12:
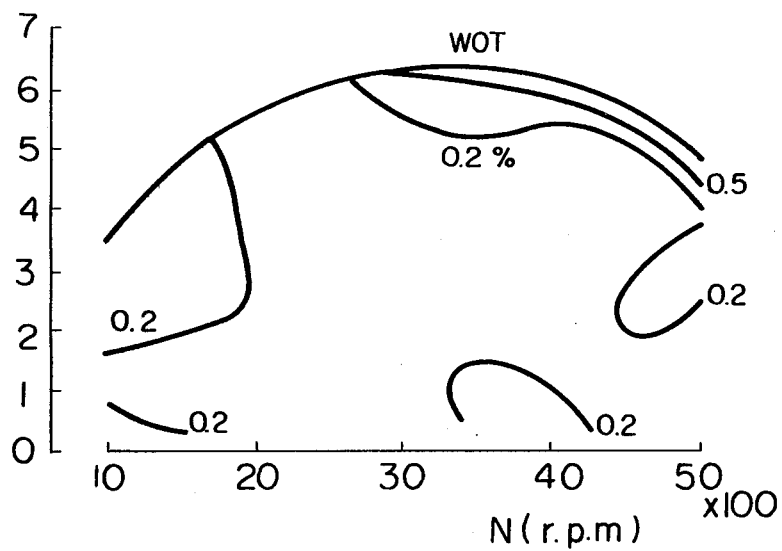
FIG. 12 is a diagram illustrating the concentration of carbon monoxide.
Figure 13:
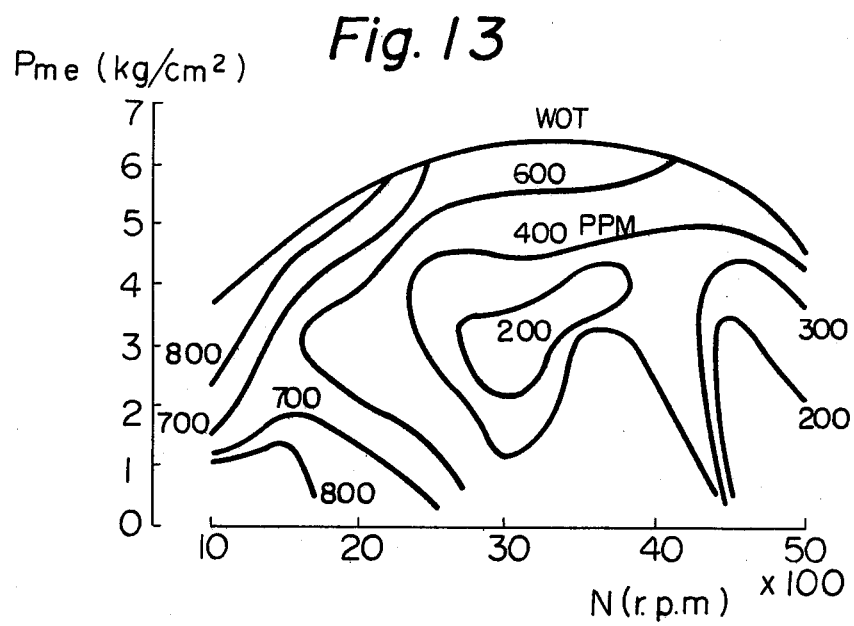
FIG. 13 is a diagram illustrating the concentration of hydrocarbon.
Figure 14:
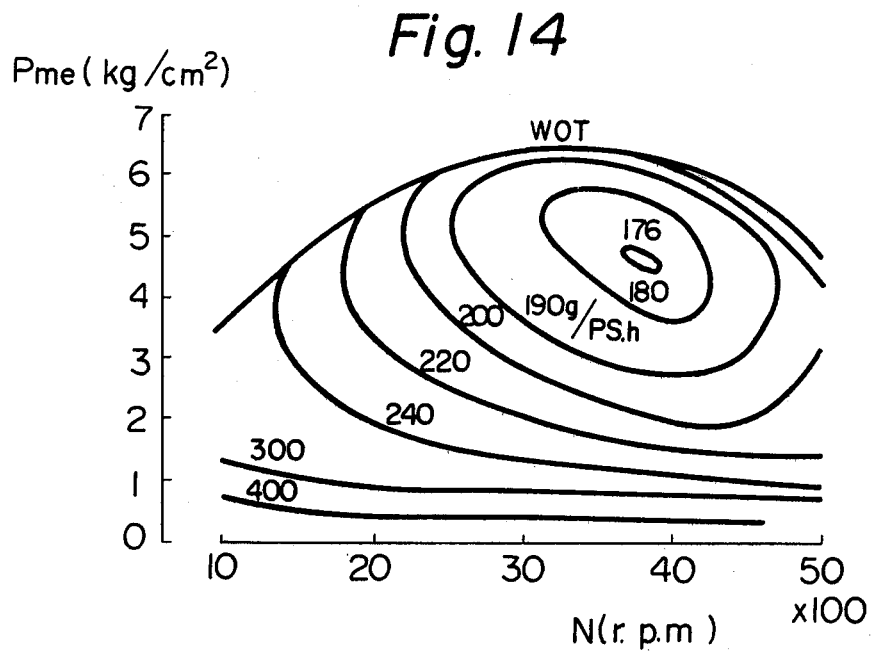
FIG. 14 is a diagram illustrating specific fuel consumption.

FIGS. 11 through 13 illustrate the results of experiments conducted by using the 370 cc engine illustrated in FIGS. 1 through 4, and FIGS. 14 through 16 illustrate the results of experiments conducted by using the 370 cc engine illustrated in FIGS. 5 through 7. In FIGS. 11 through 16, the ordinate $P_{me}$ indicates the mean effective pressure (kg/cm$^2$), and the abscissa N indicates the number of revolutions per minute of the engine. In FIGS. 11 and 14, the curved lines indicate specific fuel consumption (g/PS·h). In addition, in FIGS. 11 and 14, WOT indicates a full load curve, and from the full load curve WOT it will be understood that a high torque is obtained over a wide range of the number of revolutions per minute of the engine N (r.p.m). In addition, from FIGS. 11 and 14, it will be understood that, in the present invention, since fuel is prevented from escaping into the exhaust pipe 22, and the combustion of a lean mixture, which is controlled by stratification, can be carried out, a good specific fuel consumption can be obtained over the entire range of the operating condition of the engine as compared with a conventional engine having a size which is almost the same as that of the engine used in the experiments.

Figure 15:
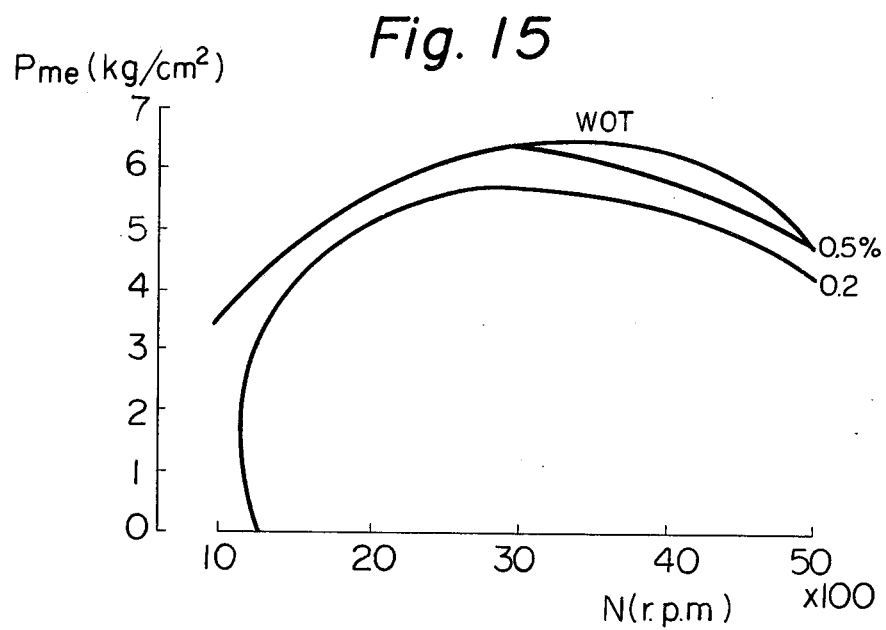
FIG. 15 is a diagram illustrating the concentration of carbon monoxide.

In FIGS. 12 and 15, the curved lines indicate the concentration (%) of carbon monoxide. From FIGS. 12 and 15, it will be understood that, in the present invention, since the combustion of a lean mixture, which is controlled by stratification, is carried out, the concentration of carbon monoxide is considerably reduced.

Figure 16:
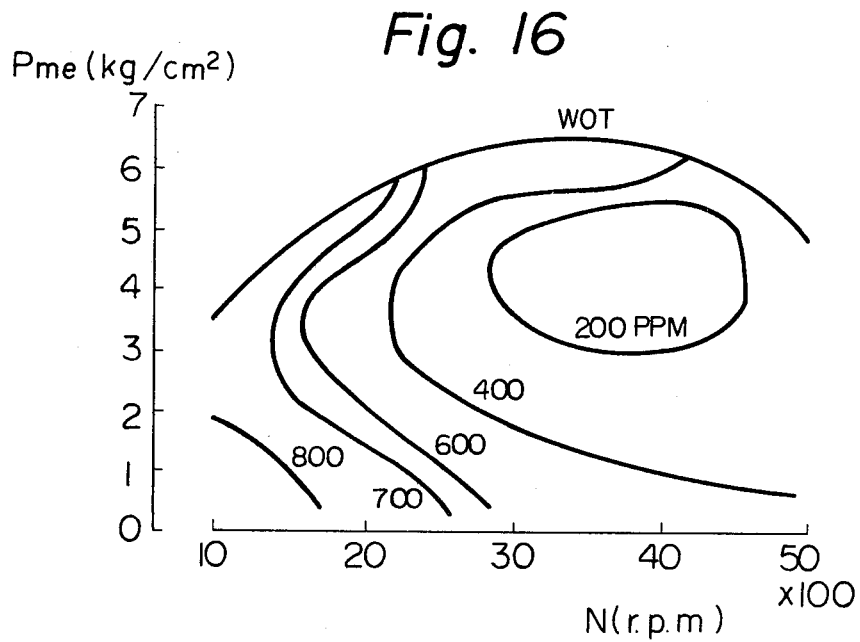
FIG. 16 is a diagram illustrating the concentration of hydrocarbon.

In FIGS. 13 and 16, the curved lines indicate the concentration (PPM) of hydrocarbon. From FIGS. 13 and 16, it will be understood that, in the present invention, since fuel is prevented from escaping into the exhaust pipe 22, and the combustion of a lean mixture, which is controlled by stratification is carried out, the concentration of hydrocarbon is considerably reduced.

FIGS. 11 through 16 illustrate the results of the experiments, obtained when the injection of fuel was carried out within the zone C in FIG. 8 and, therefore, there is no possibility of carbon being discharged into the exhaust gas. In addition, since a large amount of residual gas remains in the combustion chamber 6, the concentration of $NO_x$ is extremely small due to the presence of the residual gas, which has the same function as recirculated exhaust gas.

The results of experiments, illustrated in FIGS. 11 through 16, are obtained by using gasoline. However, it has been proven that the specific fuel consumption, the concentration of CO and the concentration of HC, which are similar to those illustrated in FIGS. 11 through 16, can be obtained by using any other fuel such as kerosene, light oil, propane and alcohol. In addition, it has also been proven that stable combustion and quiet operation of the engine can be obtained independently of the octane number and cetane number. Furthermore, needless to say, the present invention can be applied to a 4-stroke engine and a rotary piston engine.

While the invention has been described with reference to specific embodiments chosen for purposes of illustration, it should be apparent that numerous modifications could be made thereto by those skilled in the art without departing from the basic concept and scope of the invention.

We claim:

1. An ignition-combustion method of an internal combustion engine comprising a combustion chamber, a fuel injector arranged in the combustion chamber, an air-inlet port for feeding fresh air into the combustion chamber, and an exhaust gas-outlet port for discharging exhaust gas from the combustion chamber, said method comprising the steps of:
   discharging the exhaust gas from the combustion chamber via the exhaust gas-outlet port while retaining a large amount of residual gas, containing unburned components, incompletely burned components and oxygen therein, in the combustion chamber;
   gently feeding the fresh air into the combustion chamber from the air-inlet port while suppressing disturbance of the residual gas for continuing the oxidizing reaction of the unburned components and the incompletely burned components;
   injecting fuel into the combustion chamber from the fuel injector to form a combustible mixture consisting of fuel and fresh air; and
   compressing the residual gas and said combustible mixture in the combustion chamber to accelerate the oxidizing reaction and bring about self-ignition of the residual gas, which self-ignited residual gas in turn ignites said combustible mixture.

2. An ignition-combustion method according to claim 1, wherein the exhaust gas is gently discharged from the combustion chamber via the exhaust-gas outlet port for suppressing disturbance of the residual gas in the combustion chamber.

3. An ignition-combustion method according to claim 1, wherein said engine has an effective compression ratio which is smaller than 12:1, and the injecting operation of said fuel injector is started before a crank angle of about 50 degrees before the top dead center.

4. An ignition-combustion method of a 2-stroke engine comprising a combustion chamber, a fuel injector arranged in the combustion chamber, a scavenge port which is open to the combustion chamber, an exhaust port which is open to the combustion chamber, a crankcase having an interior chamber therein, and a transfer passage interconnecting the scavenge port to the interior chamber of the crankcase, said method comprising the steps of:

feeding fresh air into the interior chamber of the crankcase;
compressing the fresh air in the interior chamber of the crankcase and discharging the exhaust gas from the combustion chamber via the exhaust port while retaining a large amount of residual gas, containing unburned components, incompletely burned components and oxygen therein, in the combustion chamber;
leading the fresh air in the interior chamber of the crankcase into the transfer passage;
restricting the velocity of the flow of fresh air flowing within the transfer passage when the engine is operating under a partial load;
gently feeding the fresh air into the combustion chamber from the scavenge port while suppressing disturbance of the residual gas for continuing the oxidizing reaction of the unburned components and the incompletely burned components;
injecting fuel into the combustion chamber from the fuel injector to form a combustible mixture consisting of fuel and fresh air; and
compressing the residual gas and said combustible mixture in the combustion chamber to accelerate the oxidizing reaction and bring about self-ignition of the residual gas, which self-ignited residual gas in turn ignites said combustible mixture.

5. An ignition-combustion method according to claim 4, wherein the flow rate of the exhaust gas discharged from the combustion chamber via the exhaust port is restricted in order to suppress disturbance of the residual gas in the combustion chamber.

6. An ignition-combustion method according to claim 4, wherein the fresh air in the interior chamber of the crankcase is led into the transfer passage at the bottom of the interior chamber.

7. An ignition-combustion method according to claim 6, wherein the fresh air flows in the transfer passage for a first distance at a first speed and then flows in the transfer passage for a second distance, which is shorter than said first distance, at a second speed which is lower than said first speed.

8. An ignition-combustion method according to claim 4, wherein said engine has an effective compression ratio which is smaller than 12:1, and the injecting operation of said fuel injector is started before a crank angle of about 50 degrees before the top dead center.

9. An ignition-combustion method according to claim 8, wherein the injecting operation of said fuel injector is started after the scavenge port opens.

10. A 2-stroke internal combustion engine comprising:

a crankcase having an interior chamber therein;
a cylinder block mounted on said crankcase and having a cylinder bore therein;
a piston reciprocally movable in said cylinder bore, said piston and said cylinder bore defining a combustion chamber;
a fuel injector arranged in said combustion chamber for injecting fuel into the combustion chamber;
a transfer passage having a scavenge port at one end and an air-inlet opening at the other end, said scavenge port and said air-inlet opening being open to said combustion chamber and the interior chamber of said crankcase, respectively, so as to feed the fresh air in said interior chamber into said combustion chamber;
an exhaust passage having an exhaust port which is open to the combustion chamber so as to discharge exhaust gas from said combustion chamber; and
restricting means arranged in said transfer passage for restricting the velocity of the flow of the fresh air flowing within said transfer passage when the engine is operating under a partial load.

11. A 2-stroke internal combustion engine according to claim 10, wherein said engine further comprises another restricting means for restricting the flow rate of the exhaust gas discharged from the combustion chamber when the engine is operating under a partial load.

12. A 2-stroke internal combustion engine according to claim 11, wherein said another restricting means comprises an exhaust control valve arranged in said exhaust passage.

13. A 2-stroke internal combustion engine according to claim 10, wherein said restricting means comprises a scavenge control valve arranged in said transfer passage so as to control the flow area of said transfer passage.

14. A 2-stroke internal combustion engine according to claim 13, wherein said scavenge control valve comprises an annular plate having an opening which can be aligned with said transfer passage.

15. A 2-stroke internal combustion engine according to claim 14, wherein the area of the opening of said annular plate is increased in accordance with an increase in the level of the load of the engine.

16. A 2-stroke internal combustion engine according to claim 10, wherein said transfer passage comprises a main passage interconnecting said scavenge port to said air-inlet opening and an auxiliary passage branched off from said main passage and connected to the interior chamber of said crankcase, said restricting means comprising a scavenge control valve for selectively feeding fresh air into said combustion chamber from said air-inlet opening or said auxiliary transfer passage.

17. A 2-stroke internal combustion engine according to claim 16, wherein said auxiliary passage has a length longer than that of said main passage and has a cross-sectional area smaller than that of said main passage.

18. A 2-stroke internal combustion engine according to claim 17, wherein said auxiliary passage is connected to the bottom of the interior chamber of said crankcase.

19. A 2-stroke internal combustion engine according to claim 16, wherein said scavenge control valve is arranged in the air-inlet opening of said main passage.

20. A 2-stroke internal combustion engine according to claim 19, wherein said scavenge control valve comprises a ring-shaped member having an opening which can be aligned with the air-inlet opening of said main passage.

21. A 2-stroke internal combustion engine according to claim 20, wherein the air-inlet opening of said main passage is closed by said ring-shaped member when the engine is operating under a partial load.

22. A 2-stroke internal combustion engine according to claim 16, wherein said engine further comprises another transfer passage which is shut off by said scavenge control valve when the engine is operating under a partial load in order to stop the feeding of fresh air into said combustion chamber from said other transfer passage.

23. A 2-stroke internal combustion engine according to claim 16, wherein a check valve is arranged in said auxiliary passage so as to allow only the inflow of fresh air into said combustion chamber.

24. A 2-stroke internal combustion engine according to claim 10, wherein said piston has an approximately flat top face.

25. A 2-stroke internal combustion engine according to claim 10, wherein said engine has an effective compression ratio which is smaller than 12:1, and the injecting operation of said fuel injector is started before a crank angle of about 50 degrees before the top dead center.

26. A 2-stroke internal combustion engine according to claim 25, wherein the injecting operation of said fuel injector is started after said scavenge port opens.

* * * * *